United States Patent
Rasek et al.

(10) Patent No.: US 10,700,591 B2
(45) Date of Patent: Jun. 30, 2020

(54) VOLTAGE CONVERTER, ELECTRIC DRIVE SYSTEM AND METHOD FOR REDUCING INTERFERENCE VOLTAGES

(71) Applicant: Robert Bosch GmbH, Stuttgart (DE)

(72) Inventors: Guido Albert Rasek, Vaihingen an Der Enz (DE); Dennis Burger, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 16/062,169

(22) PCT Filed: Nov. 28, 2016

(86) PCT No.: PCT/EP2016/079014
§ 371 (c)(1),
(2) Date: Jun. 14, 2018

(87) PCT Pub. No.: WO2017/102296
PCT Pub. Date: Jun. 22, 2017

(65) Prior Publication Data
US 2018/0367025 A1    Dec. 20, 2018

(30) Foreign Application Priority Data
Dec. 14, 2015    (DE) .......................... 10 2015 225 095

(51) Int. Cl.
*H02M 1/00*    (2006.01)
*H02M 1/12*    (2006.01)
(Continued)

(52) U.S. Cl.
CPC ........... *H02M 1/126* (2013.01); *H02M 7/003* (2013.01); *H02M 7/483* (2013.01);
(Continued)

(58) Field of Classification Search
CPC ................. H02M 1/126; H02M 7/003; H02M 2001/123; H02M 2001/009
See application file for complete search history.

(56) References Cited

U.S. PATENT DOCUMENTS

| 5,345,375 A * | 9/1994 | Mohan ...................... H02J 3/01 |
| | | 307/105 |
| 7,474,081 B2 * | 1/2009 | Colombi ............. H02M 1/4216 |
| | | 323/266 |

(Continued)

FOREIGN PATENT DOCUMENTS

| CN | 104811071 A | 7/2015 |
| DE | 4107391 | 9/1992 |
| DE | 102012005622 | 9/2013 |

OTHER PUBLICATIONS

International Search Report for Application No. PCT/EP2016/079014 dated Feb. 2, 2017 (English Translation, 3 pages).

*Primary Examiner* — Adolf D Berhane
*Assistant Examiner* — Afework S Demisse
(74) *Attorney, Agent, or Firm* — Michael Best & Friedrich LLP (57) ABSTRACT

The present invention relates to interference suppression of interference signals from an inverter. To this end, an inductor is provided at the input end of an inverter, in particular a pulse-controlled inverter. This inductor is preferably arranged between a DC voltage source and the inverter. Furthermore, two capacitors, one side of which is connected to an additional conductor, are provided between the inductor and the DC voltage source and further capacitors, one side of which is likewise connected to the additional conductor, are provided at the phase connections of the inverter.

20 Claims, 3 Drawing Sheets

(51) Int. Cl.
*H02M 7/5387* (2007.01)
*H02M 7/00* (2006.01)
*H02M 7/483* (2007.01)
*H02P 27/08* (2006.01)

(52) U.S. Cl.
CPC .......... *H02M 7/5387* (2013.01); *H02P 27/08* (2013.01); *H02M 2001/009* (2013.01); *H02M 2001/123* (2013.01)

(56) References Cited

U.S. PATENT DOCUMENTS

| | | |
|---|---|---|
| 9,067,483 B2* | 6/2015 | Raynor .................... B60K 8/00 |
| 9,391,538 B2* | 7/2016 | Mohajerani ........... H02M 7/757 |
| 2007/0278988 A1 | 12/2007 | De et al. |
| 2012/0275201 A1 | 11/2012 | Koyama et al. |
| 2019/0006941 A1 | 1/2019 | Burger et al. |

* cited by examiner

VOLTAGE CONVERTER, ELECTRIC DRIVE SYSTEM AND METHOD FOR REDUCING INTERFERENCE VOLTAGES

BACKGROUND OF THE INVENTION

The present invention relates to a voltage converter and an electric drive system comprising a voltage converter and a method for reducing interference voltages. In particular, the present invention relates to the reduction of interference voltages from a voltage converter.

The German patent application DE 41 07 391 A1 discloses an electric vehicle comprising a battery-fed inverter, in particular comprising a pulse-controlled inverter. A three-phase traction motor of an electric vehicle is fed in this case via an inverter. The inverter draws its energy from a battery.

Pulse-controlled inverters can cause common-mode interference in the event of a capacitive loading such as occurs, for example, as a result of stray capacitances in a connected electric machine. In this case, it is desirable to reduce the interference voltage spectrum emitted in the environment of an electric machine in order for example to improve radio reception, in particular in the medium-wave frequency range. Besides active filter techniques it is known in this case, for example, to integrate a common-mode inductor into the connecting line between pulse-controlled inverter and electric machine. Since the connected electric machines are generally polyphase machines, such a common-mode inductor must comprise all the connecting lines.

Also known are filter structures that partly reduce the coupling-out of interference on account of power electronic switching processes via the electric motor. Interference currents and interference voltages arise as a result of parasitic capacitances from the motor windings to the motor housing and to the motor rotor. In this case, the filter structures have a positive effect, on the one hand, since the interference voltage at the rotor (vehicle shaft, MW interference in the motor vehicle) is reduced, and a negative effect, on the other hand, since the parasitic capacitance between the motor windings and the stator (housing) is increased on account of the additionally incorporated filter capacitor. As a result, the undesired interference currents are increased further. This has a disadvantageous effect in terms of e.g. magnetic field emissions and interference voltages or currents on the HV-DC supply lines.

On account of the increasing importance of electric vehicles there is therefore a need for a voltage converter which enables an effective and at the same time cost-effective filtering of interference voltages. In this case, the intention is to reduce the outlay for the filter components, to enable a delimitation of the filter effect with regard to frequency range, to limit the current through the inserted capacitors, to damp filter resonance points and additionally to reduce negative effects on other emission problems and measuring methods.

SUMMARY OF THE INVENTION

To that end, the present invention in accordance with a first aspect provides a voltage converter.

Accordingly, the present invention in a first aspect provides a voltage converter comprising an inverter and an inductor, in particular a current-compensated inductor. The inverter comprises a two-phase DC voltage input. The DC voltage input is connectable to a DC voltage source. Furthermore, the inverter comprises a polyphase AC voltage output. In particular, the AC voltage output can have at least three phase terminals. The AC voltage output is connectable to a load. In this case, the inductor of the voltage converter is arranged between the DC voltage input of the inverter and the DC voltage source.

The DC voltage input of the inverter comprises a first terminal and a second terminal. The inductor of the voltage converter furthermore comprises a first winding and a second winding. In this case, the first winding of the inductor is arranged between the first terminal of the DC voltage input of the inverter and a first terminal of the DC voltage source. The second winding of the inductor is arranged between the second terminal of the DC voltage input of the inverter and a second terminal of the DC voltage source. Furthermore, between the inductor and the DC voltage source there is arranged a first capacitor, which on one side is connected to the current path between the first terminal of the DC voltage source and the first winding of the inductor and on the other side is connected to an additional current conductor. Furthermore, there is arranged a second capacitor, which on one side is connected to the current path between the second terminal of the DC voltage source and the second winding of the inductor and on the other side is connected to the additional current conductor.

The AC voltage output of the inverter comprises a plurality of phase terminals. In this case, a capacitor is arranged between the additional current conductor and each phase terminal of the inverter. A polyphase load is connectable to the phase terminals.

The additional current conductor consists of an electrically conductive material and is a low-resistance electrical connection of the second terminals of the interference-suppression capacitors. The additional current conductor is insulated from further electrically conductive connections or housings.

Such an arrangement of the capacitors makes it possible to lead interference from the AC voltage side to the DC voltage side of the inverter, the interference being locally isolated and filtered on the additional current conductor. In particular, the interference is not transmitted to the housing of the voltage converter, a connected DC voltage source, a connected load or the electrical ground terminal of, for example, an electrically driven vehicle.

The construction of the filter thus consists, on the DC voltage side, of an inductor between the inverter and a first and a second capacitor, in particular x-capacitors with a center tap. Alternatively, the construction of the filter on the DC voltage side consists in particular of an inductor between a link circuit capacitor and the first and second capacitors. On one side, in particular with the center tap, the two capacitors lead to an additional current conductor. The center tap between the DC voltage conductors is realized in a capacitive fashion. The capacitance values of the two capacitors generally have the same magnitude. Depending on the application, however, capacitance values of the capacitors that have different magnitudes are also possible, in particular in the case of an asymmetrical radio-frequency behavior of the voltage converter or of the voltage converter and the connected components.

On the AC voltage side or motor side of the inverter, the filter consists of, in particular small, capacitors, in particular interference-suppression capacitors, which lead to a star point between the AC voltage conductors. Said star point is connected to the additional current conductor. Said additional current conductor carries the interference current whilst avoiding the disadvantages described in the introduction.

Advantageously, with this construction of the filter by means of the additional current conductor the filter effect of the DC-voltage-side capacitors, in particular x-capacitors, is combined with the AC-voltage-side filters, in particular on the motor side, of the inverter. The outlay for the required components can be minimized as a result. In particular, an x-interference suppression is also simultaneously provided with the center tap, such that a double implementation of the components is not necessary for this purpose.

Accordingly, the present invention provides a method for reducing interference voltages from a voltage converter comprising the steps of providing an inverter comprising a two-phase DC voltage input and a polyphase AC voltage output, coupling an inductor to the DC voltage input of the inverter, and arranging a first capacitor, which on one side is connected to a current path between a first terminal of the DC voltage source and a first winding of the inductor and on the other side is connected to an additional current conductor, and arranging a second capacitor, which on one side is connected to a current path between a second terminal of the DC voltage source and a second winding of the inductor and on the other side is connected to the additional current conductor, and arranging respectively, a capacitor or a series circuit comprising a capacitor, an electrical resistor and/or an inductance between the additional current conductor and each phase of the polyphase AC voltage output of the inverter.

The present invention is based on the concept of providing an inductor at the input of an inverter in order in this way to minimize common-mode interference of the inverter. Preferably, the inductor required for this purpose is provided on the DC voltage side of the inverter between the inverter and a first and second input-side capacitor. The first and second capacitors are respectively arranged between an additional current conductor and a terminal of the DC voltage input of the inverter. An optional link circuit capacitor can be arranged between the two input terminals of the inverter and the inductor.

The arrangement of an inductor on the input side of the inverter enables common-mode interference of the inverter to be minimized very well. Therefore, on the output side in the polyphase connection between inverter and load it is possible to dispense with an inductor, in particular a current-compensated inductor, which would involve a very high outlay on account of the higher number of phases between inverter and load. The voltage converter according to the invention thus enables a simple and cost-effective suppression of interference. By virtue of providing an additional current conductor, to which the first and second capacitors between the inductor and the DC voltage source and also the capacitors at the phase terminals of the inverter are connected on one side, the filtered interference is advantageously not conducted back to the structure (for example ground plate or vehicle structure) but rather on a separate path around the interference source (power electronics, in particular the inverter). That prevents the negative side effects described in the introduction. What is furthermore advantageous is that the three inserted capacitors at the three phases of the electric machine are no longer led toward the housing, or reference potential. A lower dielectric strength is sufficient as a result. Accordingly, the components can be chosen more favorably and in a smaller fashion and can also be embodied as ceramic component instead of film component.

In accordance with a further embodiment, a series circuit comprising the capacitor and an electrical resistor and/or inductance is arranged between the additional current conductor and each phase terminal of the inverter. Capacitor and resistor and/or inductance thus form an RC or RCL element. In this way, it is possible for the interference voltage spectrum emitted by the inverter to be damped in a targeted manner for a predefined frequency range. By introducing the electrical/ohmic resistors, it is possible to minimize the common-mode current that is coupled out.

In accordance with a further embodiment, the capacitor or the series circuit comprising the capacitor and electrical resistor and/or inductance is arranged together with the inverter in a common power module. The integration of inverter and capacitor or RC or RCL element in a common module enables a compact construction. Furthermore, a common cooling system can be provided for dissipating heat from the inverter and dissipating the electrical power loss of the RC or RCL element.

In accordance with a further embodiment, the capacitor or the series circuit comprising capacitor and electrical resistor and/or inductance is arranged on a terminal element of the electrical load. By way of example, the capacitors or the RC or RCL elements can be arranged on the load side in the vicinity of the connecting terminals of the load.

In accordance with a further embodiment, the voltage converter furthermore comprises a link circuit capacitor. Said link circuit capacitor is arranged between the first terminal and the second terminal of the DC voltage input of the inverter. In particular, the link circuit capacitor is arranged between the inductor and the DC voltage input of the inverter.

In accordance with a further exemplary embodiment of the method for reducing interference voltages, the method comprises a step for arranging respectively a capacitor or a series circuit comprising capacitor and electrical resistor and/or inductance (RC or RCL element) between the additional current conductor and each phase of the polyphase AC voltage output of the inverter.

In accordance with a further aspect, the present invention provides an electric drive system comprising a DC voltage source, an electric motor and a voltage converter according to the invention.

Further embodiments and advantages of the present invention will become apparent from the following description with reference to the accompanying drawings.

DETAILED DESCRIPTION

Figure 1:
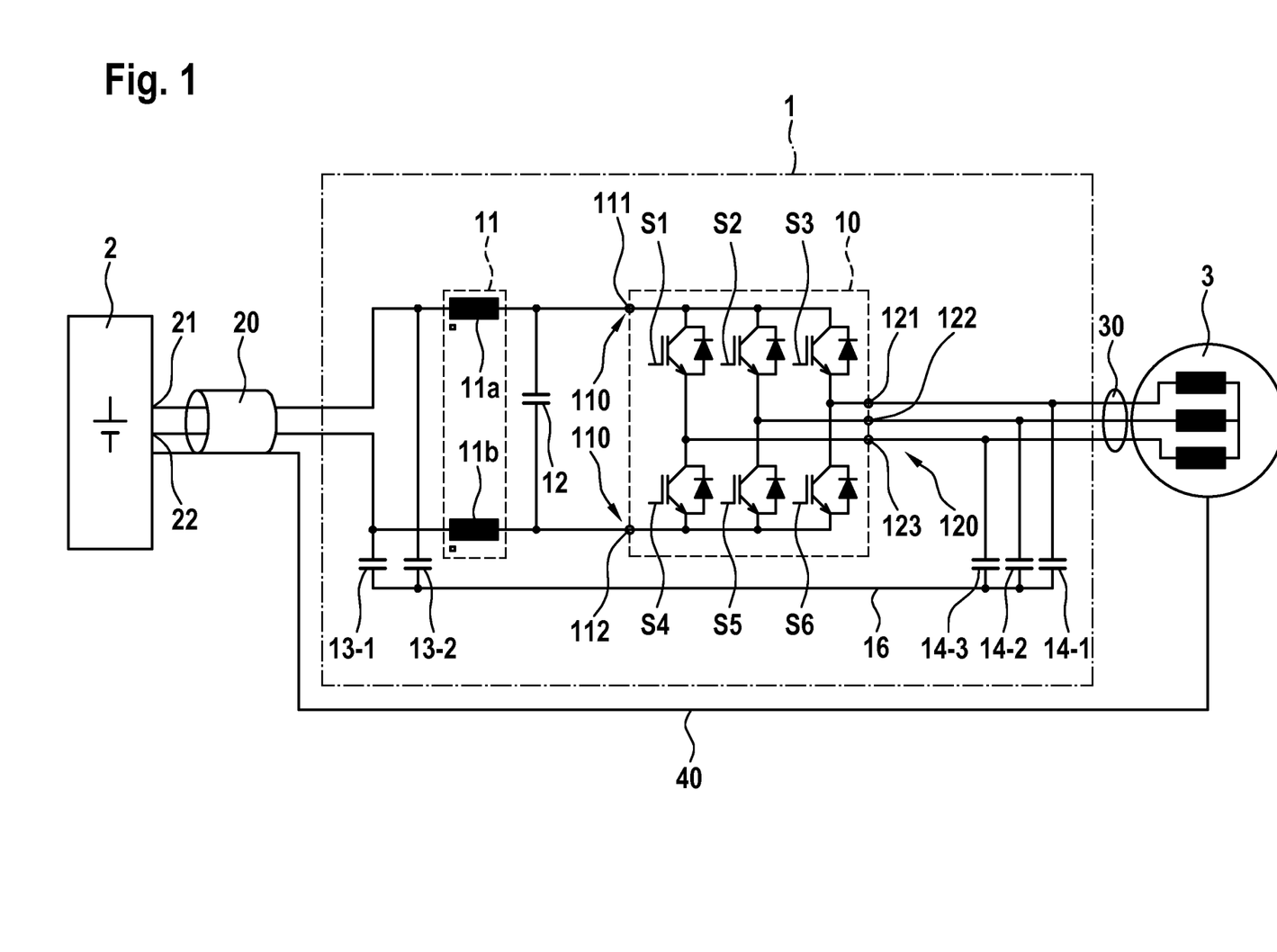
FIG. 1: shows a schematic illustration of an electric drive system comprising a voltage converter in accordance with one exemplary embodiment.

FIG. 1 shows a schematic illustration of an electric drive system in accordance with one embodiment. The electric drive system comprises a DC voltage source 2, an electrical load 3 and a voltage converter 1. Furthermore, the electric drive system can if appropriate, as necessary, also comprise further components. For the sake of providing a better understanding of the invention, however, possible further components of the electric drive system have not been illustrated here. The DC voltage source 2 can be a battery, for example. In particular, the traction battery of an electric vehicle is possible, for example, as the DC voltage source 2. Furthermore, arbitrary further DC voltage sources are possible, however, as the DC voltage source 2. The electrical load 3 can be, as illustrated here, a three-phase electric motor, for example. In this case, by way of example, arbitrary electric motors are possible as the electrical load 3. In particular, the electric motor 3 can be an asynchronous machine or a synchronous machine. In this case, the number of three electrical phases for the electrical load 3 as illustrated here should be understood to be likewise merely by way of example. Furthermore, arbitrary electric motors or else arbitrary other electrical loads which have a number of phases deviating from three are also possible. In particular, electrical loads having six phases are also possible.

Even though the electric drive system is described hereinafter to the effect that a voltage converter 1 is fed by a DC voltage source 2 and the inverter 1 is connected at the output to an electrical load 3, nevertheless the drive system can furthermore if appropriate, in a further operating mode, also convert electrical energy provided by the electric motor in a generator mode into a DC voltage by means of the inverter 1. Said DC voltage can thereupon be fed into the DC voltage source 2 in order in this way to charge a battery, for example.

In this case, the voltage converter 1 comprises an inverter 10. The inverter 10 can be a pulse-controlled inverter (PCI), for example. In particular, the inverter 10, as illustrated schematically in FIG. 1, can comprise for example a plurality of switching elements S1 to S6. Said switching elements can be for example semiconductor switching elements in the form of IGBTs or MOSFETs. The fundamental construction of an inverter, in particular of pulse-controlled inverters, is known, however, and so the construction need not be described in detail here.

On the DC voltage side, the inverter 10 has a two-phase DC voltage input 110. In this case, a first terminal 111 of the DC voltage input 100 is connected to one terminal 21 of the DC voltage source 2. The other terminal 112 of the DC voltage input 110 of the inverter 10 is connected to a further terminal 22 of the DC voltage source 2. Between the DC voltage source 2 and the inverter 10, the voltage converter 1 furthermore comprises an inductor 11, in particular a current-compensated inductor 11. In this case, the inductor 11 comprises two windings 11a and 11b. In this case, a first winding 11a of the inductor 11 is arranged between the first terminal 21 of the DC voltage source 2 and the first terminal 111 of the inverter 10. The second winding 11b of the inductor 11 is arranged between the second terminal 22 of the DC voltage source 2 and the second terminal 112 of the DC voltage input 110 of the inverter 10.

Furthermore, the voltage converter 1 can comprise a link circuit capacitor 12 between the inductor 11 and the DC voltage input 110 of the inverter 10. In this case, said link circuit capacitor 12 is connected by one terminal to the current path between the first winding 11a of the inductor 11 and the first terminal 111 of the DC voltage input 110 of the inverter 10. The other terminal of the link circuit capacitor 12 is connected to the current path between the second winding 11b of the inductor 11 and the second terminal 112 of the DC voltage input 110 of the inverter 10.

Furthermore, the voltage converter 1 comprises a first and a second capacitor 13-1 and 13-2 between the inductor 11 and the DC voltage source 2. In this case, the first capacitor 13-1 on one side is connected to the current path between the first terminal 21 of the DC voltage source and the first winding 11a of the inductor 11. The other terminal of the first capacitor 13-1 is connected to an additional current conductor 16. Analogously, a second capacitor 13-2 on one side is connected to a current path between the second terminal 22 of the DC voltage source 2 and the second winding 11b of the inductor 11. The other terminal of said second capacitor 13-2 is likewise connected to the additional current conductor 16.

For the purpose of connecting the voltage converter 1 to the DC voltage source 2, the voltage converter 1 can be connected to the DC voltage source 2 via a suitable cable connection 20.

On the output side of the inverter 10 of the voltage converter 1, the inverter 10 provides a polyphase AC voltage at an AC voltage output 120. As already described above, the three-phase AC voltage output illustrated here should be understood merely to be by way of example. A number of phases deviating from three for the AC voltage is furthermore likewise possible.

In the exemplary embodiment illustrated here, the AC voltage output 120 comprises three terminals 121, 122 and 123. Each of said terminals 121 to 123 is connected to a corresponding terminal of the electrical load 3. Here, too, a suitable cable connection 30 can be provided between the voltage converter 1 and the electrical load 3.

In the exemplary embodiment illustrated here, in particular a common reference potential 40, or a ground line, of the electric drive system is illustrated. By way of example, said ground line 40 connects the housings of the DC voltage source 2, of the connected load 3, of the voltage converter 1 (this connection is not illustrated for reasons of clarity) and/or the shielding conductors of the cable connections 20, 30 to one another.

An output-side capacitor 14-1, 14-2 and 14-3 is respectively provided between the individual phase terminals, that is to say the connections between the terminals 121 to 123 of the inverter 10 and the electrical load 3, on one side and the additional current conductor 16 on the other side. In this case, a first terminal of a first capacitor 14-1 is electrically connected to a current path between the first terminal 121 of the AC voltage output 120 of the inverter and the first phase terminal of the electrical load 3. The other terminal of the first capacitor 14-1 is electrically connected to the additional current conductor 16. Analogously, the second capacitor 14-2 is connected to the current path between the second terminal 122 of the AC voltage output 120 and the second phase terminal of the electrical load 3 on one side and to the additional current conductor 16 on the other side. A third capacitor 14-3 is likewise connected to the current path between the third terminal 123 of the AC voltage output 120 and the third phase terminal of the electrical load 3 on one side and to the additional current conductor 16 on the other side.

In this case, the output-side capacitors 14-i between the additional current conductor 16 and the terminals 121, 122 and 123 at the AC voltage output 120 can be arranged for example jointly with the inverter 110 in a common power module. In particular, it is possible in this case to arrange the inverter 10 and the capacitors 14-i for example on a common carrier substrate. Alternatively, the capacitors 14-i arranged between the terminals 121, 122 and 123 at the AC voltage terminal 120 of the inverter 10 and the additional current conductor 16 can also be arranged jointly with the electrical load 3 together in one unit. By way of example, the capacitors 14-i can be arranged at the connecting terminals of the electrical load 3.

Figure 2:
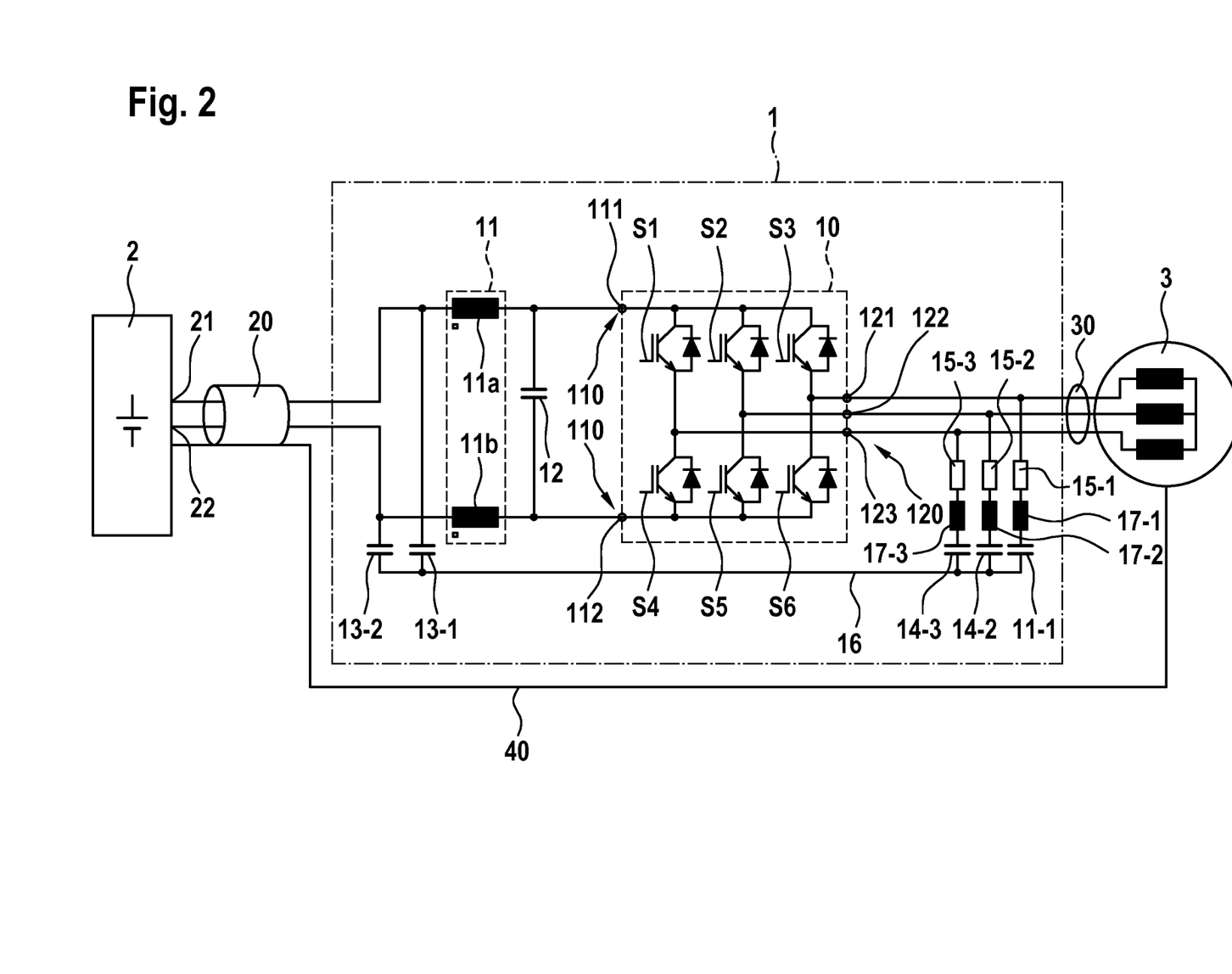
FIG. 2: shows a schematic illustration of an electric drive system comprising a voltage converter in accordance with a further exemplary embodiment.

FIG. 2 shows a further embodiment of an electric drive system comprising a voltage converter 1 in accordance with one embodiment. In this case, this embodiment is very largely identical to the embodiment described above. The two embodiments differ here merely in the fact that in the embodiment in accordance with FIG. 2 now a series circuit comprising respectively a capacitor 14-$i$ and an electrical/ohmic resistor 15-1, 15-2, 15-3 and/or an inductance 17-1, 17-2, 17-3 is provided instead of the capacitors 14-$i$ between the terminals 121, 122 and 123 of the AC voltage output 120 and the additional current conductor 16. In this case, it is unimportant whether the electrical resistors 15-$i$ and/or the inductances 17-$i$ are arranged between the additional current conductor 16 and the corresponding capacitors 14-$i$, or whether, alternatively, the resistors and/or the inductances are arranged between the capacitors 14-$i$ and the individual terminals 121, 122 and 123 of the AC voltage output 120 and, consequently, all three capacitors 14-$i$ are connected on one side to the common additional current conductor 16.

Each series circuit comprising a resistor 15-$i$ and/or an inductance 17-$i$ and the corresponding capacitor 14-$i$ thus forms an RC or RCL element. In this case, the additional ohmic resistors 15-$i$ serve as damping resistors. The additional inductances 17-$i$ serve for the frequency-specific tuning of the filter.

In the case of the dimensioning of the resistors 15-$i$ and/or of the inductances 17-$i$, the individual RC or RCL elements can be optimized in this case for the filtering of a predefined frequency range, for resonance suppression and/or for current limiting.

In particular, by way of example, a frequency band for radio reception, for example in the medium-wave band, can be chosen as the frequency range to be filtered. The resistors 15-$i$ and/or inductances 17-$i$ additionally introduced in this way make it possible here to minimize the common-mode current additionally coupled out and to damp the interference voltage spectrum emitted by the inverter 10 in particular for a frequency range predefined in a targeted manner.

If the resistors 15-$i$ and/or inductances 17-$i$ or the RC or RCL elements comprising the series circuit comprising the resistors 15-$i$ and/or inductances 17-$i$ and the capacitors 14-$i$ are in this case arranged jointly with the components of the inverter 10 in a common power module, then a particularly efficient construction is possible in this case. In particular, it is possible for the cooling system provided for the cooling of the inverter 10 also simultaneously to be provided for dissipating the heat from the RC or RCL elements, in particular the electrical energy converted into heat at the ohmic resistors 15-$i$ and/or inductances 17-$i$. Alternatively, analogously to the exemplary embodiment described in FIG. 1, here as well the RC or RCL elements comprising the resistors 14-$i$ and 15-$i$ and/or 17-$i$ can be arranged in the electrical load 3.

In this case, in principle, arbitrary embodiments can be chosen as electrical resistors 15-$i$, inductances 17-$i$ and respectively as capacitors 14-$i$. In particular, by way of example, ceramic SMD capacitors and SMD chip resistors are possible.

The voltage converter 1 according to the invention comprising an inductor 11 at the DC voltage input of the inverter 10 can be used here for arbitrary applications. In this regard, by way of example, electric drive systems for electric or hybrid vehicles are possible. Furthermore, inverter-fed industrial drives are likewise conceivable. Furthermore, the voltage converter according to the invention can for example also be used for industrial inverters, such as, for example, for solar installations or the like.

Figure 3:
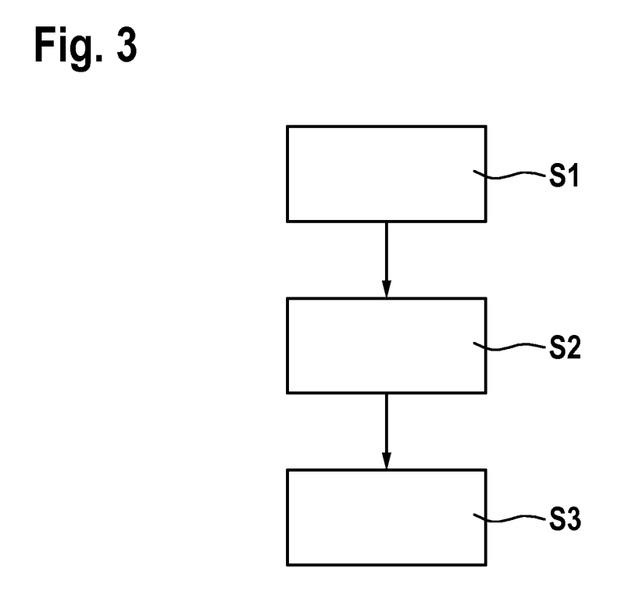
FIG. 3 shows a schematic illustration of a flow diagram such as forms a basis of a method for reducing interference voltages in accordance with one exemplary embodiment.

FIG. 3 shows a schematic illustration of a flow diagram for a method for reducing interference voltages from a voltage converter 1 such as forms a basis of one embodiment. Step S1 involves providing an inverter 10 comprising a two-phase DC voltage input 110 and a polyphase AC voltage output 120. Step S2 involves coupling this provided inverter 10 at the DC voltage input 110 to an inductor 11. In step S3, between an additional current conductor 16 and a respective phase terminal 121, 122, 123 of the polyphase AC voltage output 120 of the inverter, there is arranged respectively a capacitor 14-$i$ or alternatively a series circuit comprising a capacitor 14-$i$ and an electrical resistor 15-$i$ and/or an inductance 17-$i$ and there is arranged a first capacitor 13-1, which on one side is connected to a current path between a first terminal 21 of the DC voltage source 2 and a first winding 11$a$ of the inductor 11 and on the other side is connected to the additional current conductor 16, and there is arranged a second capacitor 13-2, which on one side is connected to a current path between a second terminal 22 of the DC voltage source 2 and a second winding 11$b$ of the inductor 11 and on the other side is connected to the additional current conductor 16.

To summarize, the present invention relates to a cost-effective and efficient interference suppression of interference signals from an inverter. To that end, an inductor, in particular a current-compensating inductor, is provided on the input side at an inverter, in particular a pulse-controlled inverter. Said inductor is preferably arranged between a DC voltage source and a link circuit capacitor of the inverter. Polyphase inductors at the AC voltage output of the inverter can be obviated in this way. Furthermore, by virtue of providing an additional current conductor, to which a first and second capacitor between the inductor and the DC voltage source and also capacitors at the phase terminals of the inverter are connected on one side, the filtered interference is advantageously not conducted back to the structure (for example ground or ground line or ground plate or vehicle structure) but rather on a separate path around the interference source (power electronics, in particular the inverter).

The invention claimed is:

1. A voltage converter, comprising:
   an inverter, comprising a two-phase DC voltage input, which is connectable to a DC voltage source, and comprising a polyphase AC voltage output, which is connectable to an electrical load; and
   an inductor arranged between the DC voltage input of the inverter and the DC voltage source, wherein the DC voltage input comprises a first terminal and a second terminal and wherein the inductor comprises a first winding and a second winding, wherein the first winding is electrically connected between the first terminal of the DC voltage input of the inverter and a first terminal of the DC voltage source and the second winding is electrically connected between the second terminal of the DC voltage input of the inverter and a second terminal of the DC voltage source,
   wherein
   between the inductor and the DC voltage source there are arranged a first capacitor, which on one side is connected to the current path between the first terminal of the DC voltage source and the first winding of the inductor and on the other side is connected to an additional current conductor, and
   a second capacitor, which on one side is connected to the current path between the second terminal of the DC voltage source and the second winding of the inductor and on the other side is connected to the additional current conductor, wherein the AC voltage output of the inverter comprises a plurality of phase terminals, and wherein an output side capacitor is arranged between each phase terminal of the inverter and the additional current conductor, and wherein the inverter and the output side capacitor are arranged in a common power module.

2. The voltage converter as claimed in claim 1, a series circuit comprising the output side capacitor, an electrical resistor and/or an inductance is arranged between each phase terminal of the inverter and the additional current conductor.

3. The voltage converter as claimed in claim 1, wherein the inverter and a series circuit comprising the output side capacitor, an electrical resistor and/or an inductance are arranged in the common power module.

4. The voltage converter as claimed in claim 1, furthermore comprising a link circuit capacitor, wherein the link circuit capacitor is connected at one side to the current path between the first winding and the first terminal of the DC voltage input of the invertor and connected at another side to the current path between the second winding of the inductor and the second terminal of the DC voltage input of the inverter.

5. The voltage converter as claimed in claim 4, wherein the voltage converter is free from step-down converters.

6. The voltage converter as claimed in claim 4, wherein the link circuit capacitor is connected to the first capacitor through the first winding and to the second capacitor through the second winding via non-switch connections.

7. The voltage converter as claimed in claim 4, wherein the link circuit capacitor is a single link circuit capacitor connected at the one side directly to the first terminal of the DC voltage input of the invertor and connected at the another side directly to the second terminal of the DC voltage input of the inverter.

8. The voltage converter as claimed in claim 1, wherein the first winding is always in direct connection to the first terminal of the DC voltage source and the second winding is always in direct connection to the second terminal of the DC voltage source.

9. The voltage converter as claimed in claim 1, wherein the voltage converter is free from step-down converters.

10. The voltage converter as claimed in claim 1, wherein the first capacitor and the second capacitor are always free from a direct connection to a switch.

11. An electric drive system, comprising:
a DC voltage source including a traction battery;
an electric motor; and
a voltage converter having
an inverter, comprising a two-phase DC voltage input, which is connectable to the DC voltage source, and comprising a polyphase AC voltage output, which is connectable to an electrical load; and
an inductor arranged between the DC voltage input of the inverter and the DC voltage source, wherein the DC voltage input comprises a first terminal and a second terminal and wherein the inductor comprises a first winding and a second winding, wherein the first winding is arranged between the first terminal of the DC voltage input of the inverter and a first terminal of the DC voltage source and the second winding is arranged between the second terminal of the DC voltage input of the inverter and a second terminal of the DC voltage source,
wherein
between the inductor and the DC voltage source there are arranged a first capacitor, which on one side is connected to the current path between the first terminal of the DC voltage source and the first winding of the inductor and on the other side is connected to an additional current conductor, and
a second capacitor, which on one side is connected to the current path between the second terminal of the DC voltage source and the second winding of the current-compensated inductor and on the other side is connected to the additional current conductor,
wherein the AC voltage output of the inverter comprises a plurality of phase terminals, wherein an output side capacitor is arranged between each phase terminal of the inverter and the additional current conductor, and wherein the inverter and the output side capacitor are arranged in a common power module.

12. The electric drive system as claimed in claim 11, wherein the electric drive system is free from step-down converters.

13. An electric vehicle including the electric drive system as claimed in claim 11, and wherein the DC voltage source includes a traction battery.

14. The electric drive system as claimed in claim 11, including a cooling system for dissipating heat from the inverter.

15. The electric drive system as claimed in claim 11, wherein the first capacitor and the second capacitor are always free from a direct connection to a switch.

16. The electric drive system according to claim 11, wherein the voltage converter includes a single link circuit capacitor connected at one side to the current path between the first winding and the first terminal of the DC voltage input of the invertor and connected at another side to the current path between the second winding of the inductor and the second terminal of the DC voltage input of the inverter, and wherein the single link capacitor is connected at the one side directly to the first terminal of the DC voltage input of the invertor and connected at the another side directly to the second terminal of the DC voltage input of the inverter.

17. A method for reducing interference voltages from a voltage converter, the method comprising:
providing an inverter comprising a two-phase DC voltage input and a polyphase AC voltage output;
coupling an inductor to the DC voltage input of the inverter;
arranging a first capacitor, which on one side is connected to a current path between a first terminal of the DC voltage source and a first winding of the inductor and on the other side is connected to an additional current conductor, and a second capacitor, which on one side is connected to a current path between a second terminal of the DC voltage source and a second winding of the inductor and on the other side is connected to the additional current conductor, and respectively an output side capacitor or a series circuit comprising the output side capacitor and an electrical resistor and/or an inductance between the additional current conductor and each phase of the polyphase AC voltage output of the inverter, wherein the inverter and the output side capacitor are arranged in a common power module.

18. The method according to claim 17, wherein the first winding is always in direct connection to the first terminal of the DC voltage source a switch and the second winding is always in direct connection to the second terminal of the DC voltage source.

19. The method according to claim 17, wherein the voltage converter is free from step-down converters.

20. The method according to claim 17, wherein the first capacitor and the second capacitor are always free from a direct connection to a switch.

\* \* \* \* \*